US006759488B1

(12) United States Patent
Sellergren et al.

(10) Patent No.: US 6,759,488 B1
(45) Date of Patent: Jul. 6, 2004

(54) MOLECULARLY IMPRINTED POLYMERS GRAFTED ON SOLID SUPPORTS

(75) Inventors: Börje Sellergren, Mainz (DE); Claudia Sulitzky, Mainz (DE); Bärbel Rückert, Mainz (DE)

(73) Assignee: MIP Technologies AB, Lund (SE)

( * ) Notice: Subject to any disclaimer, the term of this patent is extended or adjusted under 35 U.S.C. 154(b) by 114 days.

(21) Appl. No.: 10/069,068

(22) PCT Filed: Sep. 14, 2000

(86) PCT No.: PCT/SE00/01776

§ 371 (c)(1),
(2), (4) Date: Feb. 21, 2002

(87) PCT Pub. No.: WO01/19886

PCT Pub. Date: Mar. 22, 2001

(30) Foreign Application Priority Data

Sep. 17, 1999 (SE) ................................................ 9903387
Jan. 28, 2000 (SE) ................................................ 0000294

(51) Int. Cl.$^7$ .................................................. C08F 2/00
(52) U.S. Cl. .......................... 526/67; 526/199; 526/200; 526/218.1
(58) Field of Search ............................... 526/218.1, 67, 526/199, 200

(56) References Cited

U.S. PATENT DOCUMENTS

| | | | | | |
|---|---|---|---|---|---|
| 5,310,648 | A | * | 5/1994 | Arnold et al. | .................. 435/5 |
| 5,786,428 | A | * | 7/1998 | Arnold et al. | ............ 525/333.3 |
| 5,814,223 | A | * | 9/1998 | Hjerten et al. | ................ 210/635 |
| 6,063,637 | A | * | 5/2000 | Arnold et al. | ................ 436/94 |
| 6,127,154 | A | * | 10/2000 | Mosbach et al. | ......... 435/173.1 |
| 6,379,599 | B1 | * | 4/2002 | Vaidya et al. | ................ 264/220 |
| 2002/0197645 | A1 | * | 12/2002 | Martin | ........................ 435/7.1 |
| 2003/0129092 | A1 | * | 7/2003 | Murray | ..................... 422/82.07 |

FOREIGN PATENT DOCUMENTS

WO    WO 00/07702 A2    2/2000

OTHER PUBLICATIONS

Liang et al., Reversible Surface Properties of Glass Plate and Capillary Tubs Grafted by Photopolymerization of N–Isopropylacrylamide, *Macromolecules*, vol. 31, pp 7845–7850 (1998).
Nakayama et al., "Surface Macromolecular Microarchitecture Design: Biocompatible Surfaces Via Photo–Block–Graft–Copolymerization Using N,N–Diethyldithiocarbamate," *Langmuir*, vol. 15, pp. 5560–5566 (1999).
Wang et al., "Surface Molecualr Imprinting on Photosensitive Dithiocarbamoyl Polyacrylonitrile Membranes Using Photograft Polymerization," *J. Chem. Tech. Biotechnol.*, vol. 70, pp. 355–362 (1997).
Piletsky et al., "Surface Functionalization of Porous Polypropylene Membranes With Molecularly Imprinted Polymers by Photograft Copolymerization in Water," *Macromolecules*, vol. 33, pp. 3092–3098 (2000).

Molecular Imprinting in Cross–Linked Materials with the Aid of Molecular Templates—A Way towards Artificial Antibodies, Günter Wulff, Angew. Chem. Int. Ed. Engl. 1995, 34, pp. 1812–1832.
Molecular and Ionic Recognition with Imprinted Polymers, ACS Symposium Series 703, Richard A. Bartsch, et al., Developed from a symposium sponsored by the Division of Industrial and Engineering Chemistry at the 213$^{th}$ National Meeting, American Chemical Society, Washington, DC, San Francisco, CA, Apr. 13–17, 1997, p. 39.
Molecular imprinting, Klaus Mosbach, TIBS 19—Jan. 1994, pp. 9 to 14.
Polymers: Chemistry and Physics of Modern Materials, Second Edition, J.M.G. Cowie, 1991, pp. 52 to 82.
Highly Enantioselective and Substrate–Selective Polymers Obtained by Molecular Imprinting Utilizing Noncovalent Interactions. NMR and Chromatographic Studies on the Nature of Recognition, Börje Sellegren, et al., Contribution from the Department of Pure and Applied Biochemistry, Lund Institute of Technology, University of Lund, P.O. Box 124, 221 00 Lund, Sweden, Received Sep. 17, 1987, J. Am. Chem. Soc. 1988, 110, pp. 5853 to 5860.
Influence of polymer morphology on the ability of imprinted network polymers to resolve enantiomers, Börje Sellergren, et al., Department of Chemistry, University of California, Irvine, CA 92717 (USA), Journal of Chromatography, 635 (1993), Elsevier Science Publishers B.V., Amsterdam, pp. 31 to 49.
Molecular Imprinting of Amino Acid Derivatives at Low Temperature (0° C) Using Photolytic Homolysis of Azobisnitriles, Daniel J. O'Shannessy, et al., Pure and Applied Biochemistry, Chemical Center, University of Lund, Box 12, S–22100 Lund, Sweden, Received Apr. 20, 1988, Analytical Biochemistry 177, pp. 144 to 149 (1989).
Molecular imprinting by noncovalent interactions, Enantioselectivity and binding capacity of polymers prepared under conditions favoring the formation of template complexes, Börje Sellergren, Makromol. Chem. 10, pp. 2703 to 2711 (1989).

(List continued on next page.)

*Primary Examiner*—Helen L Pezzuto
(74) *Attorney, Agent, or Firm*—Burns, Doane, Swecker & Mathis, L.L.P.

(57) ABSTRACT

The invention refers to a molecularly imprinted polymer, a method of preparing a molecularly imprinted polymer material, and the use thereof. According to the invention a support comprising at least one monomer, and a template, in a polymerization medium is polymerized with a free radical initiator, whereafter the template is removed from the molecularly imprinted polymer obtained. The polymerization is confined to the surface of the support, preferably by confining the free radical initiator to the support by bonding adsorption. The molecularly imprinted polymer may be used in chromatography, for separations, in chemical sensors, in molecular recognition as stationary phase in capillaries, in selected sample enrichment or in catalysis.

38 Claims, 5 Drawing Sheets

OTHER PUBLICATIONS

A Wiley–Interscience Publication, John Wiley & Sons, Inc. Introduction to Modern Liquid Chromatography, Second Edition, Basic Concepts and Control of Separation, L.R. Snyder, et al., pp. 22 to 25.

Molecularly Imprinted Polymer Beads: Suspension Polymerization Using a Liquid Perfluorocarbon as the Dispersing Phase, Andrew G. Mayes, et al., Pure and Applied Biochemistry, Chemical Center, Anal. Chem. 1996, 68, pp. 3769 to 3774.

Solid–phase Extraction of a Triazine Herbicide Using a Molecularly Imprinted Synthetic Receptor, Jun Matsui, et al, Laboratory of Synthetic Biochemistry, Faculty of Information Sciences, Hiroshima City University, Analytical Communications, Mar. 1997, vol. 34, pp. 85 to 87.

Short Communication, Imprinted dispersion polymers: a new class of easily accessible affinity stationary phases, Börje Sellergren, Department of Analytical Chemistry, Journal of Chromatography A, 673 (1994) Elsevier Science B.V., pp. 133 to 141.

Molecularly imprinted monodisperse microspheres for competitive radioassay, Lei Ye, et al., Pure and Applied Biochemistry, Chemical Center, Anal. Commun., 1999, 36, pp. 35 to 38.

Enzyme–Analogue Built Polymers, 18 Chiral Cavities in Polymer Layers Coated on Wide–Pore Silica, Günter Wulff, et al, Institute of Organic Chemistry II of the university of Düsseldorf, Reactive Polymers, 3 (1985) pp. 261 to 275, Elsevier Science Publisher B.V. Amsterdam.

Molecularly imprinted composite polymers based on trimethylolpropane trimethacrylate (TRIM) particles for efficient enantiomeric separations, Magnus Glad, et al., Pure and Applied Biochemistry, University of Lund, Chemical Center, Reactive Polymers 25 (1995) Elsevier Science B.V., pp. 47 to 54.

Surface Modification with Molecularly–Imprinted Polymers for Selective Recognition, Frances H. Arnold, et al., Division of Chemistry and Chemical Engineering, California Institute of Technology, pp. 97 to 98.

Capillary Electrochromatography with Predetermined Selectivity Obtained through Molecular Imprinting, Leif Schweitz, et al., Division of Technical Analytical Chemistry, Center for Chemistry and Chemical Engineering, Anal. Chem. 1997, 69; pp. 1179 to 1183.

Comparison of polymer coatings of capillaries for capillary electrophoresis with respect to their applicability to molecular imprinting and electrochromatography, Oliver Brüggemann, et al., Journal of Chromatography A, 781 (1997) pp. 43 to 53.

Enantioseparation of D,L–Phenylalanine by Molecularly Imprinted Polymer Particles Filled Capillary Electrochromatography, Jin–Ming Lin, et al., Department of Industrial Chemistry, Faculty of Engineering, Tokyo Metropolitan University, J. Liq. Chrom & Rel. Technol., 20(10), pp. 1489 to 1506 (1997).

Functional Polymers Supported on Porous Silica, II. Radical Polymerization of Vinylbenzyl Chloride from Grafted Precursors, Eric Carlier, et al., Reactive Polymers, 16 (1991/ 1992) pp. 115 to 12, Elsevier Science Publishers B.V., Amsterdam.

Short Communication, Functional polymers supported on porous silica, III. Routes for anchoring chloromethyl groups, Eric Carlier, et al., Reactive Polymers 18 (1992) pp. 167 to 171, Elsevier Science Publishers B.V., Amsterdam.

Graft Polymerization of Vinyl Monomers from Inorganic Ultrafine Particles Initiated by Azo Groups Introduced onto the Surface, Norio Tsubokawa, et al., Department of Material and Chemical Engineering, Niigata University, Polymer Journal, vol. 22, No. 9, pp. 827 to 833 (1990).

Photografting of Vinyl Polymers onto Ultrafine Inorganic Particles: Photopolymerization of Vinyl Monomers Initiated by Azo Groups Introduced onto these Surfaces, Norio Tsubokawa, et al., Department of Chemistry and Chemical Engineering, Faculty of Engineering, Niigata University, Journal of Polymer Science: Part A: Polymer Chemistry, vol. 32, pp. 2327 to 2332 (1994).

Propagation of Vinyl Polymers on Clay Surfaces, I. Preparation, Structure, and Decomposition of Clay Initiators, Henri G.G. Dekking, Union Research Center, Union Oil Company of California, Journal of Applied Polymer Science, vol. 9, pp. 1641 to 1651 (1965).

Surface Macromolecular Microarchitecture Design: Biocompatible Surfaces via Photo–Block–Graft–Copolymerization Using N,N–Diethyldithiocarbamate, Y. Nakayama, et al., Department of Bioengineering, National Cardiovascular Center Research Institute, Langmuir 1999, 15, pp. 5560 to 5566.

* cited by examiner

A. GRAFT POLYMERIZATION

B. FILTER, WASH, AND DRY THE PARTICLES

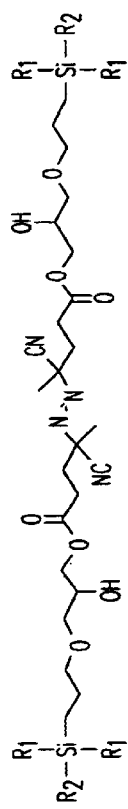
FIG. 4A
FIG. 4B
MICROWAVE
FIG. 4C

MOLECULARLY IMPRINTED POLYMERS GRAFTED ON SOLID SUPPORTS

TECHNICAL FIELD OF THE INVENTION

The present invention relates to a molecularly imprinted polymer, to a method for preparing said molecularly imprinted polymer, and to the use of said molecularly imprinted polymer.

BACKGROUND ART

In the fields of medical, dietary, environmental and chemical sciences there is an increasing need for the selective separation of specific substances in complex mixtures of related substances. The end goal can be the preparative isolation of a certain compound or compounds or measurements of their concentration. Molecularly imprinted polymers (MIPs) often exhibit a high selectivity towards their substrate in analogy with the antibody-antigen complementarity. (1, 2) The technique shows promise in chiral separations of for example amino acid derivatives, peptides, phosphonates, aminoalcohols and beta-blocking compounds, affinity chromatography of nucleotides and the DNA-bases as well as substitute for antibodies in immunoassays for commercial drugs. Molecular imprinting (MI) consists of the following key steps: (1) Functional monomers are allowed to interact reversibly with a template molecule in solution. (2) The hereby formed template assemblies are copolymerised with a cross-linking monomer resulting in a cross-linked network polymer. (3) The template is displaced and the resulting MIP material can be used for selective molecular recognition of the corresponding compound. If the MIP material is crushed and sieved it can be-packed in a chromatographic column and used for chromatographic separation of the template from structurally related analogs. Analytical as well as preparative applications are here possible. Preparative applications can be separation of a compound from a complex mixture of structurally related compounds and isolation of the compound. This can be through an affinity chromatographic procedure where pH, ion strength or solvent gradients can be used in order to control the strength of interaction with the stationary phase The separation can target enantiomers or diastereomers in a mixture of enantiomers or diastereomers of one or many compounds. Analytical applications can in addition to the above mentioned separations be: competetitive binding assays, chemical sensors or selective sample enrichments.

Currently the most widely applied technique to generate molecularly imprinted binding sites is represented by the non-covalent route developed by the group of Mosbach(3). This makes use of non-covalent self-assembly of the template with functional monomers prior to polymerisation, free radical polymerisation with a cross-linking monomer and then template extraction followed by rebinding by non-covalent interactions. Although the preparation of a MIP by this method is technically simple it relies on the success of stabilisation of the relatively weak interactions between the template and the functional monomers. Stable monomer-template assemblies will in turn lead to a larger concentration of high affinity binding sites in the resulting polymer. The materials can be synthesized in any standard equipped laboratory in a relatively short time and some of the MIPs exhibit binding affinities and selectivities in the order of those exhibited by antibodies towards their antigens. Most MIPs are synthesized by free radical polymerisation of functional monounsaturated (vinylic, acrylic, methacrylic) monomers and an excess of cross-linking di- or triunsaturated (vinylic, acrylic, methacrylic) monomers resulting in porous organic network materials. These polymerisations have the advantage of being relatively robust allowing polymers to be prepared in high yield using different solvents (aqueous or organic) and at different temperatures (4). This is necessary in view of the varying solubilities of the template molecules.

The most successful non-covalent imprinting systems are based on commodity acrylic or methacrylic monomers, such as methacrylic acid (MAA), cross-linked with ethyleneglycol dimethacrylate (EDMA). Initially, derivatives of amino acid enantiomers were used as templates for the preparation of imprinted stationary phases for chiral separations (MICSPs) but this system has proven generally applicable to the imprinting of templates allowing hydrogen bonding or electrostatic interactions to develop with MAA.(5, 6) The procedure applied to the imprinting with L-phenylalanine anilide (L-PA) is outlined in FIG. 1. In the first step, the template (L-PA), the functional monomer (MAA) and the cross-linking monomer (EDMA) are dissolved in a poorly hydrogen bonding solvent (diluent) of low to medium polarity. The free radical polymerisation is then initiated with an azo initiator, commonly azo-N,N'-bis-isobutyronitrile (AIBN) either by photochemical homolysis below room temperature(6, 7) or thermochemically at 60° C. or higher (5). Lower thermochemical initiation temperatures down to 40° C. or 30° C. may be obtained using azo-N,N'-bis-divaleronitrile (ABDV) and V70 resp. instead of AIBN as initiator (see). (7, 8) In the final step, the resultant polymer is crushed by mortar and pestle or in a ball mill, extracted by a Soxhlet apparatus, and sieved to a particle size suitable for chromatographic (25–38 μm) or batch (150–250 μm) applications. (6) The polymers are then evaluated as stationary phases in chromatography by comparing the retention time or capacity factor (k') (9) of the template with that of structurally related analogs.

As appears from above MIPs have sofar been prepared in the form of continuous blocks that need to be crushed and sieved before use. This results in a low yield of irregular particles, a high consumption of template and a material exhibiting low chromatographic efficiency. There is therefore a need for MI-materials that can be prepared in high yield in the form of regularly shaped particles with low size dispersity and a controlled porosity. These are expected to be superior in terms of mass transfer characteristics and sample load capacity compared to the materials obtained from the monolithic approach.

Such MIPs have been previously prepared through suspension(10, 11)—polymerisation techniques, dispersion polymerisation(12) or precipitation polymerisation(13). This resulted in spherical particles of a narrow size distribution. These procedures have the limitation of being very sensitive to small changes in the manufacturing conditions and the type of solvents and polymerisation conditions that can be applied. Thus the procedures need careful optimization for each new template target which significantly reduces the usefulness of this route. Moreover conditions leading to low dispersity spherical particles may not be compatible with conditions leading to high selectivity and affinity for the template target.

An alternative to this procedure is the coating of preformed support materials. (14–16) MIPs have been prepared as grafted coatings on oxide supports(14, 16) on organic polymer supports(15) and on the walls of fused silica capillaries(17–19). The former technique allows the use of the wide variety of oxide support materials available with different sizes and porosities. Grafting techniques to prepare organic polymer coatings are expected to be generally applicable to molecular imprinting since the structure of the underlying support is already fixed. Thus compared to the large number of factors influencing the end result in suspension or precipitation type polymerisations a smaller number of factors is likely to influence the end result in the preparation of the imprinted coatings. This will make the grafted coatings techniques less sensitive to changes in conditions offering a more robust method. These types of coating techniqes are furthermore applicable to modify surfaces of monolithic type supports or microchips prepared by lithographic techniques. The oxide based materials are rigid porous supports with a limited inner pare volume. An alternative support that could potentially carry more grafted imprinted polymer per unit weight and thus allow a higher density of imprinted sites would be to make use of swellable organic resins. In this context Merrifield resins containing grafted initiator or monomer could be used.

So far most imprinted coatings have been prepared by grafting polymers to the various surfaces. Thus she surface contains prior to polymerisation polymerizable double bonds that can add to the growing polymer chains in solution linking them to the surface. The problem with this technique is the presence of initiator in solution requiring the monomer mixture to be applied as a liquid thin film on the surface prior to polymerization. Thus the exact amount of monomers that will coat the available surface with an up to ca 100 Å thick liquid film is dissolved together with initiator in an excess of solvent. Thereafter the modified support is added and the solvent evaporated to leave the monomer film and initiator on the surface. Polymerisation is then carried out usually at elevated temperatures. With this procedure the thickness of the polymer layer is difficult to control and capillary forces upon evaporation of solvent may cause incomplete wetting of the surface. Moreover a continuous method of synthesising the particles is difficult to envisage with this method.

A considerable improvement in this regard would be to confine the initiator radicals to the support surface. (FIG. 2). (20, 21) In absence of chain transfer this would lead to chain growth occuring only from the surface of the support with no polymerisation occuring in solution. For molecular imprinting this would have important consequences. For instance the polymerisation can be carried out on the surface of initiator modified support particles suspended in a mixture of the monomers and solvent. This would allow polymerisation in a simple tank reactor by either thermal or photochemical initiation. The latter technique would allow the particles to be modified during the sedimentation possibly leading to a continuous method for preparing the imprinted composite particles (FIG. 3). Polymerisation would here only occur on the particle surface leaving the solution containing the monomers unreacted. The monomer solution can thus be reused for the coating of several batches of particles. The problem of confining polymer chain growth to the support surface and suppress it in solution can be solved by attaching the radical initiator so that the radical formed upon bond homolysis remains bound to the surface. Alternatively the radical formed that is not attached to the surface should undergo rapid reaction to give an unreactive species. It should be possible to prepare the grafted coatings using monomers such as those based on styren/divinylbenzene, methacrylates, acrylates, acrylamides and in the presence of one or more template molecules.

SUMMARY OF THE INVENTION

Thus, the present invention relates to a molecularly imprinted polymer obtainable by polymerising a composition comprising at least one monomer, and a template, on a support in a polymerisation medium with a free radical initiator, whereafter the template is removed from the molecularly imprinted polymer obtained, said polymerisation being confined to the surface of the support.

The invention further relates to a method for preparing a molecularly imprinted polymer which comprises polymerising a composition comprising at least one monomer, and a template, on a support in a polymerisation medium with a free radical initiator, whereafter the template is removed from the molecularly imprinted polymer obtained, said polymerisation being confined to the surface of the support.

Still further the invention relates to the use of a molecularly imprinted polymer as defined above in chromatography, for separations, in chemical sensors, in molecular recognition as stationary phase in capillaries, in selective sample enrichment or in catalysis.

These and other advantages and characterising features of the present invention will appear from the following specification and the appended claims.

BRIEF DESCRIPTION OF THE DRAWINGS

FIG. 4A illustrates the use of a presynthesized azosilane initiator where both ends may be attached to the surface of a support.

FIG. 4B illustrates an initiator that may be preadsorbed on a support surface and that is insoluble in the monomer containing solution.

FIG. 4C illustrates the use of microwaves to selectively heat the particle surface.

DETAILED DESCRIPTION OF THE INVENTION

Figure 1:
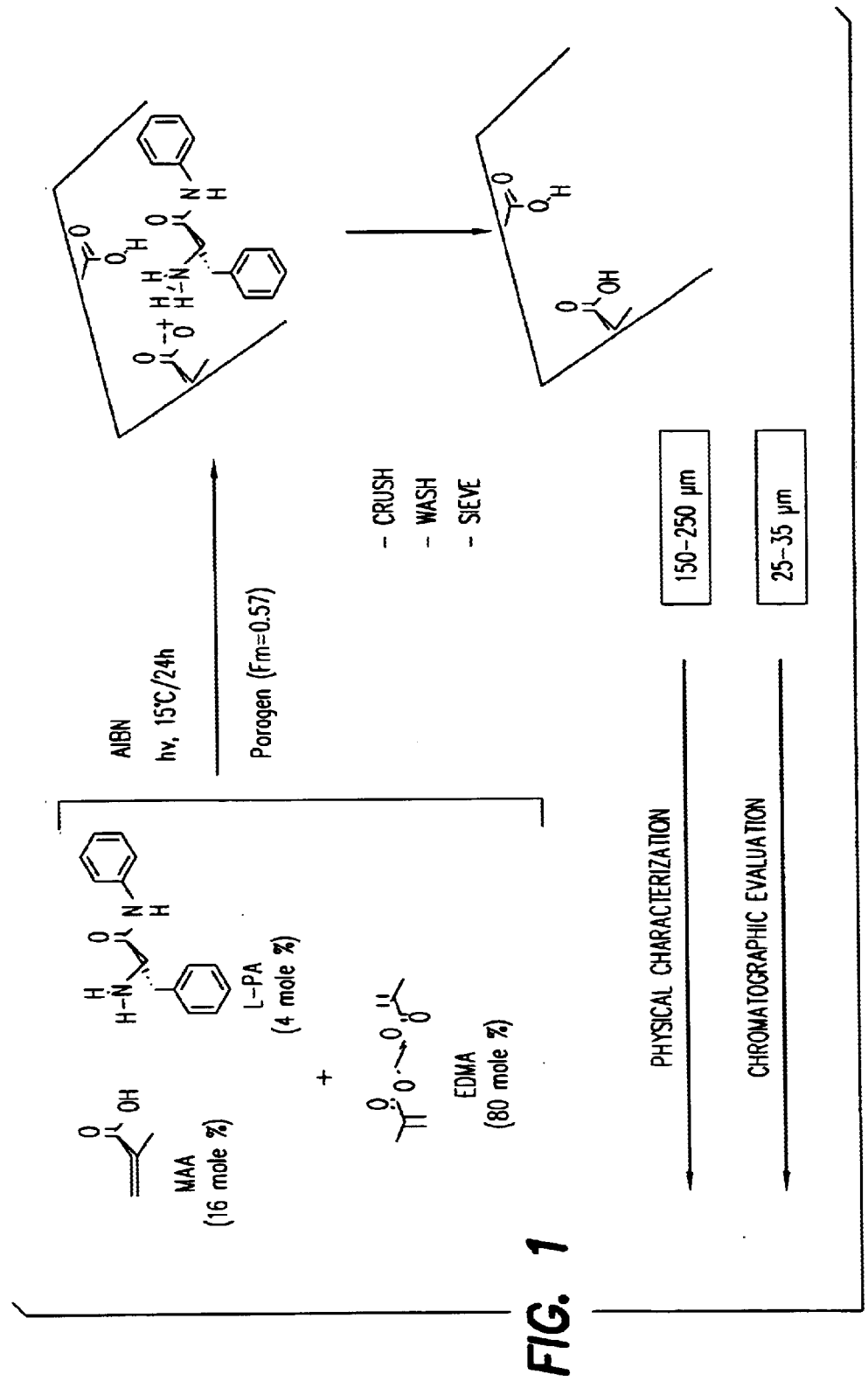
FIG. 1 illustrates molecular imprinting with L-phenylalanine anilide (L-PA).
Figure 2:
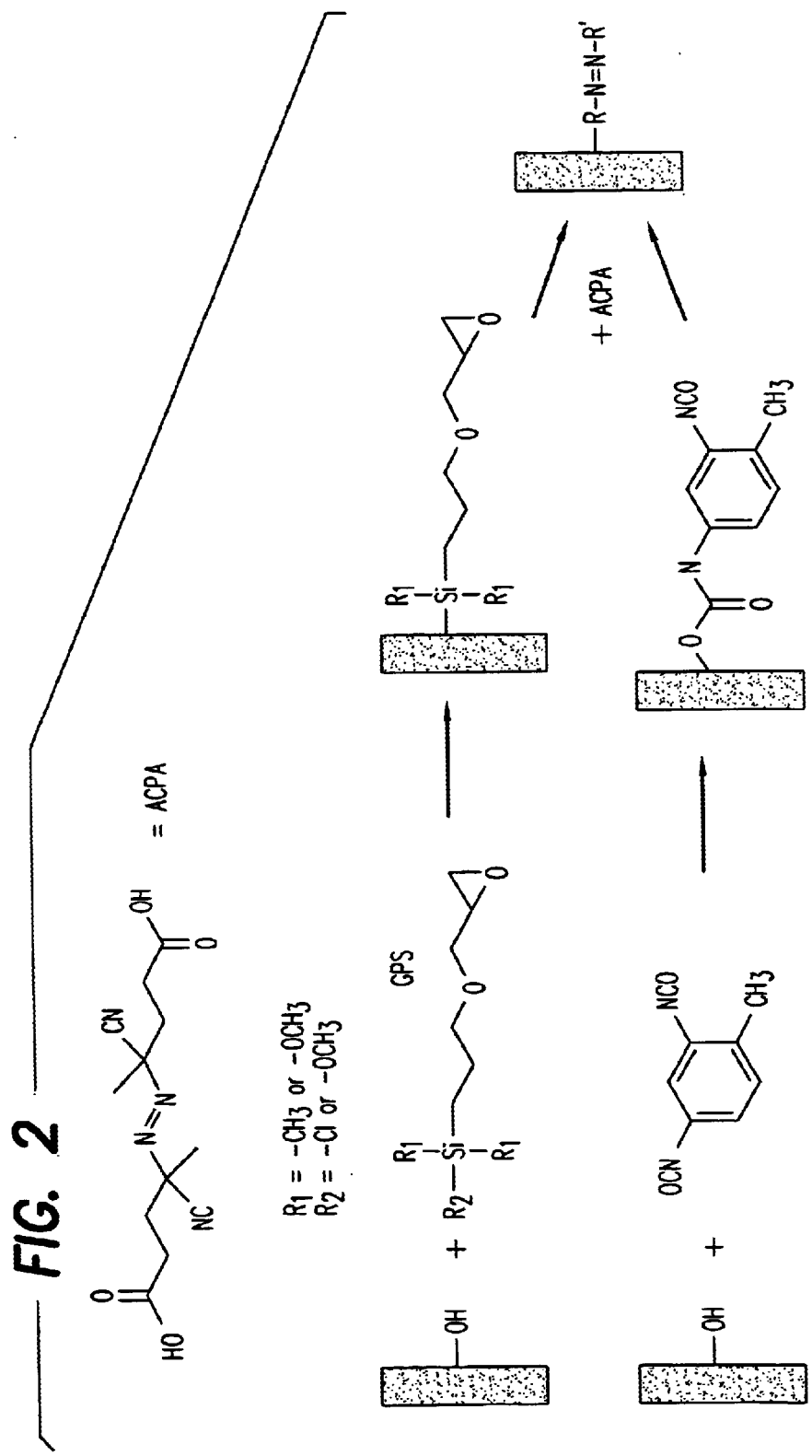
FIG. 2 illustrates the procedure of confining initiator radicals to the surface of a support.

The invention will now be described in more detail with reference to a number of non-limiting examples:

The invention refers to a material that consists in a support (porous or nonporous material or planar surface) coated with a polymer layer, a method for its fabrication and use of said material in for instance chromatography, for separations, in chemical sensors, in selective sample enrichment, in molecular recognition as stationary phase in capillaries or in catalysis. The material is prepared by grafting a polymer layer on the surface of a preformed organic or inorganic support material or surface. The grafting can be combined with the technique of molecular imprinting.

In one embodiment of the present invention the polymerisation is confined to the surface of the support by confining the free radical initiator to the support. According to one aspect the free radical initiator is bound (covalently or non-covalently such as e.g. by hydrogen bonds) to the surface of the support. According to another aspect the free radical initiator is adsorbed to the surface of the support, preferably by dissolving it in a solvent for the free radical initiator, applying the solution to the support, and removing the solvent, said free radical initiator being insoluble in the polymerisation medium or remaining attached to the support surface by adsorptive forces.

In another embodiment of the present invention the polymerisation is confined to the surface of the support by subjecting the composition, the support and the free radical initiator to microwave irradiation which selectively heats the support and thereby initiates a polymerisation reaction at the surface of the support.

In a further embodiment of the present invention the polymerisation is repeated at least once with a different composition to obtain at least one further layer of molecularly imprinted polymer. This allows the manufacturing of layered surfaces containing one or more imprinted layers using possibly different templates and layers of different polarity or other functional properties.

The support used in the present invention is preferably selected from the group consisting of porous and non-porous, planar and non-planar inorganic and organic supports. As examples of such support materials may be mentioned oxides such as alumina and silica, and organic resins in the form of particles such as spheres, or sheets.

The template used in the present invention may be any molecule or ion and is preferably selected from the group consisting of organic or inorganic molecule entities, ions, antibodies, antigens, amino acids, peptides, proteins, nucleotides, DNA-bases, carbohydrates, drugs, pesticides, and derivatives thereof, etc.

The expression "polymerisation medium" as used herein means a liquid medium in which the polymerisation is carried out. The polymerisation medium may e.g. be a solvent in which the monomers are soluble. It may also be a monomer acting as a solvent for the other components of the polymerisable composition.

The support surface is prepared as follows. A free radical initiator is bound to the surface either covalently or noncovalently so that the free radicals generated upon initiation remain confined to the surface or vicinity of the surface. The absence of polymer propagation in solution will lead to a higher accessibility of the monomers at the surface. Furthermore this method will allow the tuning of the thickness of the polymer layer.

Surface attachment of a free radical initiator has been disclosed generally by Guyot et.al. (21) and Tsubokawa et.al. (22, 23) It relies on presilanization of the surface using 3-aminopropyltriethoxysilane or a glycidoxypropylsilane (GPS) followed by reaction of the amino groups or the epoxy groups with an azoinitiator such as azo-bis (cyanopentanoic acid, ACPA) leading to the formation of an amide (using DCC as condensing reagent) or ester link between the surface and the azoinitiator. Also peroxy initiators may be used although better results are obtained using the grafted azoinitiator followed by photochemical initiation. High yields of grafted polymer are obtained using silica reacted with toluene-2,4-diisocyanate (TDI) followed by reaction with ACPA.

EXAMPLE 1

Coupling of Initiator to Amino, Epoxy or Chloromethyl Modified Supports or Resins Epoxy and chloromethyl modified supports: A typical example is as follows. Into a flask, 3 g of epoxy modified particles 50 mL of DMSO, 0.5 g of ACPA and picoline were charged. The reaction mixture was stirred for 5 h at 50° C. After the reaction the particles were washed with methanol and dried.

Amino modified supports: A typical example is as follows. Into a flask, 3 g of epoxy modified particles 50 mL of DMF, 0.5 g of ACPA and dicyclohexyldicarbodiimide (DCCI) and base were charged. The reaction mixture was stirred for 5 h. After the reaction the particles were washed with methanol and dried.

The above procedure does not confine all initiator radicals to the surface since the initiator is bound at only one position. This invention describes three alternative procedures to confine the polymerisation to the surface;

1. The use of a presynthesized azosilane (FIG. 4A). This will more likely lead to a two point attachment of the initiator to the surface.

EXAMPLE 2

Synthesis of Azosilane for two Point Coupling of an Azoinitiator to a Surface or Support The azosilane was synthesized by mixing 0.5 mole glycidoxypropyltrimethoxysilane (GPS) and 0.25 mole ACPA in 200 mL isopropanol and catalytic amounts of picoline. The reaction was allowed to continue at room temperature and the product isolated by evaporation to dryness followed by purification by column chromatography giving the product in 60% yield.

EXAMPLE 3

Coupling of Silane to a Surface

The silane was coupled by reaction in water at low temperature (20° C.) for 24 hours.

2. Preadsorbtion of an initiator that is insoluble in the monomer containing solution. Thus, a polar water soluble initiator as for instance an azo-bis-amidine, (24) can be adsorbed to the surface from aqueous solvent, the surface dried and then the polymerisation initiated as described above (FIG. 4B). The free radicals generated from the initiator will stay associated to the surface due to their insolubility in the monomer mixture.

EXAMPLE 4

Adsorption of Amidineazoinitiator to a Support Surface

An amidineazoinitiator such as 2,2'-azobis(N,N'-dimethyleneisobutyramidine) or 2,2'-azobis(2-amidinopropane) is dissolved in methanol/water and support particles such as silica are added. After several hours of equilibration the solvent is removed by filtration and the particles dried under vacuum.

3. Use of microwaves to selectively heat the particle surface (FIG. 4C).

EXAMPLE 5

Microwave Initiated Polymerisation

Particles are added to a solution of monomers and initiator in a suitable solvent. The polymerisation is initiated by microwave irradiation at a wavelength causing local heating of the particles only.

Figure 4D:
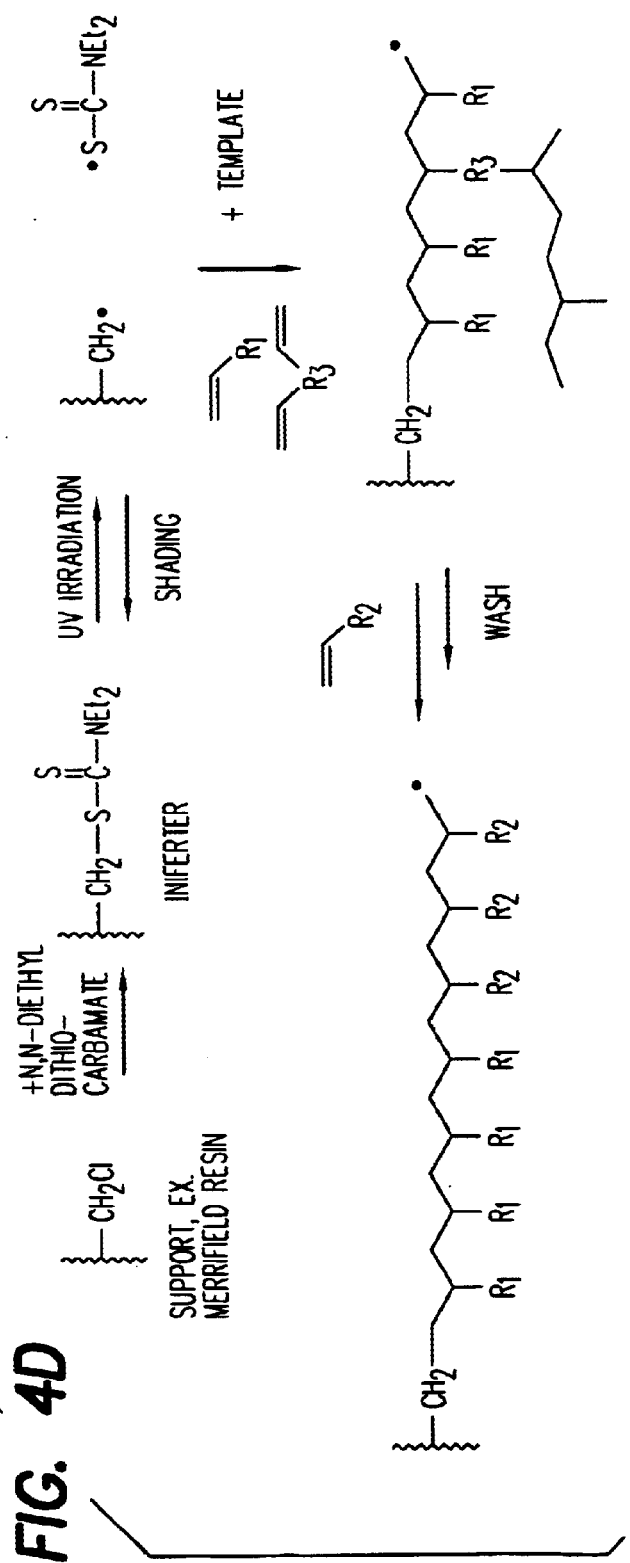
FIG. 4D illustrates the use of iniferters such as dithiocarbamate coupled onto the surface.

4. Use of iniferters such as dithiocarbamate coupled onto the surface (FIG. 4D). (25) (The term "iniferter" is an abbreviation for "initiator+transfer agent+terminator").

EXAMPLE 6

Synthesis of Support or Polymeresin Bound Initiator

To a surface or polymer containing bound chloromethyl groups is given N,N-diethyldithiocarbamate in solution and the reaction allowed to proceed at elevated temperatures.

EXAMPLE 7

Synthesis of Block-graft Imprinted Copolymer

Particles or a surface containing bound dithiocarbamate groups are/is added to a mixture of monomers (concentration about 5 moles/liter), template and solvent under nitrogen. The polymerisation was initiated by irradiation with an ultrahigh pressure mercury UV lamp and allowed to proceed for a certain time. Then the unreacted monomers and template were washed away. The obtained particles or surface can then be immersed in another solution containing another monomer and the procedure repeated. This allows the manufacturing of layered surfaces containing one or more imprinted layers using possibly different templates and layers of different polarity or other functional properties.

EXAMPLE 8

Endcapping of Unreacted Silanol Groups

Prior to polymerisation endcapping of unreacted silanol groups can be done. Hexamethylsilazane is here effective. Good wetting is critical for the formation of a homogenous layer fully covering the support. Another possibility to enhance the wetting is to use organosilanes containing functionalities resembling solvents known to be good solvents for the methacrylates polymerisations. Among these chlorinated hydrocarbons are particularly useful.

Grafting of Polymer Layer

Figure 3:
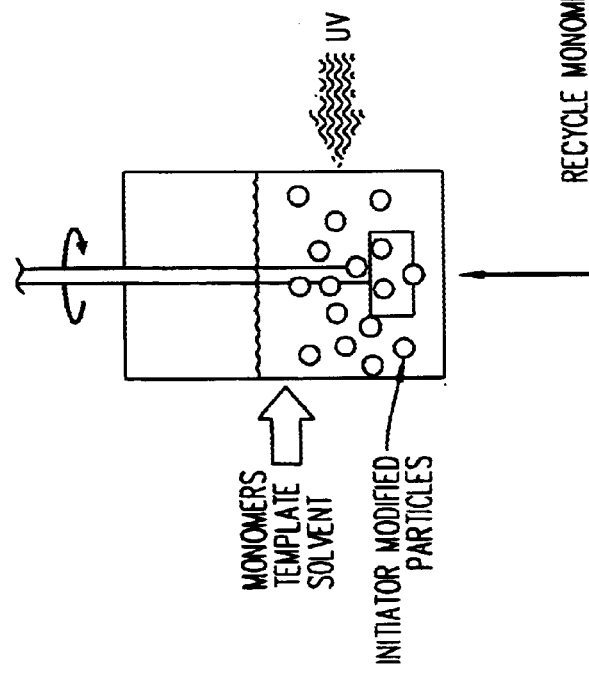
FIG. 3 illustrates a method for preparing imprinted composite particles.
Figure 3:
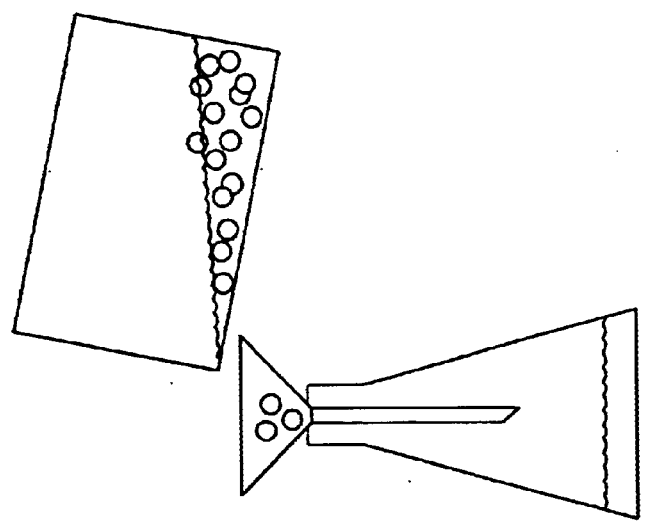

The polymerisation can be carried out in a stirred suspension of the particles in the monomer mixture since growth only takes place on the surface (see FIG. 3). Thus the initiator modified particles are added to a monomer containing solution and solvent and possibly a template and the suspension stirred. The polymerisation is then carried out photochemically or thermally. The particles can be based on any inorganic or organic support material and the template on any molecule or ion dissolved in the monomer mixture solution. The grafting can also occur on other surfaces such as those generated by lithographic processes or on the walls of capillaries or fibres. The thickness of the polymer layer is tunable by varying the time of reaction.

EXAMPLE

To a stirred solution of 38 ml (0.2 mole) EDMA, 3.4 ml (40 mmole) MAA and 10 mmole terbutylazine (or no template) in 56 ml dichloromethane is added 5 g of any of the initiator modified particles described in Examples 1–6. The suspension is sparged with nitrogen and the polymerisation initiated by UV irradiation using a standard high pressure mercury lamp at 15° C. or by heating to a temperature providing a suitable rate of polymerisation. The suspension is stirred under nitrogen and UV irradiation or heating for 24 h and the particles then filtered, washed and dried under vacuum. The monomer mixture is then used to modify a second batch of particles.

The resulting particles exhibit high selectivity and affinity for the template, terbutylazine.

LITTERATURE

1. Wulff, G. 1995. *Angew. Chem., Int. Ed. Engl.* 34: 1812–32
2. Bartsch, R. A., Maeda, M. 1998. In *ACS Symposium Series 703*. Washington: Oxford University Press
3. Mosbach, K. 1994. *Trends Biochem. Sci.* 19: 9–14
4. Cowie, J. M. G. 1991. *Polymers: Chemistry & Physics* of modern materials. Glasgow: Blackie and Son Ltd.
5. Sellergren, B., Lepistoe, M., Mosbach, K. 1988. *J. Am. Chem. Soc.* 110: 5853–60
6. Sellergren, B., Shea, K. J. 1993. *J. Chromatogr.* 635: 31
7. O'Shannessy, D. J., Ekberg, B., Mosbach, K. 1989. *Anal. Biochem.* 177: 144–9
8. Sellergren, B. 1989. *Makromol. Chem.* 190: 2703–11
9. Snyder, L. R., Kirkland, J. J. 1979. *Introduction to Modern Liquid Chromatography.* US: Wiley
10. Mayes, A. G., Mosbach, K. 1996. *Anal. Chem.* 68: 3769–3774
11. Matsui, J., Okada, M., Tsuruoka, M., Takeuchi, T. 1997. *Anal. Commun.* 34: 85–87
12. Sellergren, B. 1994. *J. Chromatogr.* A. 673: 133–141
13. Lei, Y., Cormack, P. A. G., Mosbach, K. 1999. *Anal. Commun.* 36: 35–38
14. Wulff, G., Oberkobusch, D., Minarik, M. 1985. *React. Polym., Ion Exch., Sorbents.* 3: 261–75
15. Glad, M., Reinholdsson, P., Mosbach, K. 1995. *React. Polym.* 25: 47–54
16. Arnold, F. H., Plunkett, S., Dhal, P. K., Vidyasankar, S. 1995. *Polym. Prepr.* 36(1): 97–8
17. Schweitz, L., Andersson, L. I., Nilsson, S. 1997. *Anal. Chem.* 69: 1179–1183
18. Brüggemann, O., Freitag, R., Whitcombe, M. J., Vulfson, E. N. 1997. *J. Chromatogr.* 781: 43–53
19. Lin, J.-M., Nakagama, T., Uchiyama, K., Hobo, T. 1997. *J. Liq. Chromatogr. Relat. Technol.* 20: 1489–1506
20. Carlier, E., Guyot, A., Revillon, A. 1991. *React. Polym.* 16: 115
21. Carlier, E., Guyot, A., Revillon, A. 1992. *React. Polym.* 18: 167
22. Tsubokawa, N., Kogure, A., Maruyama, K., Sone, Y., Shimomura, M. 1990. *Polym. J.* 22: 827–833
23. Tsubokawa, N., Shirai, Y., Tsuchida, H., Handa, S. 1994. *J. Polym. Sci. A: Polym. Chem.* 32: 2327–2332
24. Dekking, H. G. G., 1965, *J. Appl. Polym. Sci.* 9, 1641–1651
25. Nakayama, Y.; Matsuda, T. 1999, *Langmuir*, 15, 5560–5566.

What is claimed is:

1. A supported molecularly imprinted polymer, characterised in that it is obtainable by
    (a) providing a composition comprising a polymerisation medium with at least one functional monomer, a template, a support, and a free radical initiator;
    (b) polymerisation of the composition while confining the polymerisation to the surface of the support, thereby providing a molecularly imprinted polymer on the support;
    (c) separation of the supported molecularly imprinted polymer from the polymerisation medium;
    (d) removal of the template from the supported molecularly imprinted polymer;
    (e) reuse of the polymerisation medium for preparing further supported molecularly imprinted polymer by repeating steps (a)–(d).

2. A supported molecularly imprinted polymer according to claim 1, wherein the polymerisation is confined to the surface of the support by confining the free radical initiator to the support.

3. A supported molecularly imprinted polymer according to claim 2, wherein the free radical initiator is bound or adsorbed to the surface of the support.

4. A supported molecularly imprinted polymer according to claim 1, wherein the support is selected from the group consisting of porous and non-porous, planar and non-planar inorganic and organic supports.

5. A supported molecularly imprinted polymer according to claim 1, wherein the support is a particle and the free radical initiator is an azo-initiator that is bound to the surface of the particle.

6. A supported molecularly imprinted polymer according to claim 5, wherein the azoinitiator is bound to the surface of the particle by a two point attachment.

7. A supported molecularly imprinted polymer according to claim 1, wherein the initiator is an azo-bis-amidine initiator that is adsorbed to the surface of the support and is insoluble in the polymerisation medium.

8. A supported molecularly imprinted polymer according to claim 7, wherein the initiator is 2,2'-azo-bis (2-amidinopropane) or 2,2'-azobis (N,N'-dimethyleneisobutyramidine).

9. A supported molecularly imprinted polymer according to claim 1, wherein the polymerisation is confined to the surface of the support by subjecting the composition to microwave irradiation which selectively heats the support and thereby initiates a polymerisation reaction at the surface of the support.

10. A supported molecularly imprinted polymer according to claim 1, wherein the polymerisation on the support is repeated at least once with a different composition to obtain at least one further layer of a molecularly imprinted polymer; a layer of different polarity; or a layer of other functional properties.

11. A supported molecularly imprinted polymer according to claim 1, wherein the template is selected from the group consisting of organic or inorganic molecule entities, ions, antibodies, antigens, amino acids, peptides, proteins, nucleotides, DNA-bases, carbohydrates, drugs, pesticides, and derivatives thereof.

12. A method for preparing a supported molecularly imprinted polymer, characterised by
(a) providing a composition comprising a polymerisation medium with at least one functional monomer, a template, a support, and a free radical initiator;
(b) polymerising the composition while confining the polymerisation to the surface of the support, thereby providing a molecularly imprinted polymer on the support;
(c) separating the supported molecularly imprinted polymer from the polymerisation medium;
(d) removing the template from the supported molecularly imprinted polymer;
(e) reusing the polymerisation medium for preparing further supported molecularly imprinted polymer by repeating steps (a)–(d).

13. A method according to claim 12, wherein the polymerisation is confined to the surface of the support by confining the free radical initiator to the support.

14. A method according to claim 13, wherein the free radical initiator is bound or adsorbed to the surface of the support.

15. A method according to claim 14, wherein the support is a particle and the initiator is an azoinitiator that is bound to the surface of the particle.

16. A method according to claim 15, wherein the azoinitiator is bound to the surface of the particle by a two point attachment.

17. A method according to claim 16, wherein the azoinitiator is the reaction product of glyxidoxypropyltrimethoxysilane (GPS) and azo-bis (cyanopentanoic acid) (ACPA).

18. A method according to claim 14, wherein the initiator is an azo-bis-amidine initiator that is adsorbed to the surface of the support and is insoluble in the polymerisation medium.

19. A method according to claim 18, wherein the initiator is 2,2'-azo-bis(2-amidinopropane) or 2,2'-azobis (N,N'-dimethyleneisobutyramidine).

20. A method according to claim 12, wherein the polymerisation is confined to the surface of the support by subjecting the composition to microwave irradiation which selectively heats the support and thereby initiates a polymerisation reaction at the surface of the support.

21. A method according to claim 12, wherein the polymerisation on the support is repeated at least once with a different composition to obtain at least one further layer of a molecularly imprinted polymer; a layer of different polarity; or a layer of other functional properties.

22. Azoinitiator as a means of carrying out the method of claim 12, characterised in that it is the reaction product of glyxidoxypropyltrimethoxysilane (GPS) and azo-bis-(cyanopentanoic acid) (ACPA).

23. A supported molecularly imprinted polymer according to claim 2, wherein the support is selected from the group consisting of porous and non-porous, planar and non-planar inorganic and organic supports.

24. A supported molecularly imprinted polymer according to claim 3 wherein the support is selected from the group consisting of porous and non-porous, planar and non-planar inorganic and organic supports.

25. A supported molecularly imprinted polymer according to claim 2, wherein the support is a particle and the free radical initiator is an azo-initiator that is bound to the surface of the particle.

26. A supported molecularly imprinted polymer according to claim 2, wherein the initiator is an azo-bis-amidine initiator that is adsorbed to the surface of the support and is insoluble in the polymerisation medium.

27. A supported molecularly imprinted polymer according to claim 2, wherein the polymerisation on the support is repeated at least once with a different composition to obtain at least one further layer of a molecularly imprinted polymer; a layer of different polarity; or a layer of other functional properties.

28. A supported molecularly imprinted polymer according to claim 2, wherein the template is selected from the group consisting of organic or inorganic molecule entities, ions, antibodies, antigens, amino acids, peptides, proteins, nucleotides, DNA-bases, carbohydrates, drugs, pesticides, and derivatives thereof.

29. A method according to claim 13, wherein the polymerisation on the support is repeated at least once with a different composition to obtain at least one further layer of a molecularly imprinted polymer; a layer of different polarity; or a layer of other functional properties.

30. Azoinitiator as a means of carrying out the method of claim 13, characterised in that it is the reaction product of glyxidoxypropyltrimethoxysilane (GPS) and azo-bis-(cyanopentanoic acid) (ACPA).

31. A chromatography process wherein the supported molecularly imprinted polymer of claim 1 is utilized.

32. A separation process wherein the supported molecularly imprinted polymer of claim 1 is utilized.

33. A chemical sensor comprising the supported molecularly imprinted polymer of claim 1.

34. A process for molecular recognition as stationary phase in capillaries wherein the supported molecularly imprinted polymer of claim 1 is utilized.

35. A process for selective sample enrichment wherein the supported molecularly imprinted polymer of claim 1 is utilized.

36. A catalysis process wherein the molecularly imprinted polymer of claim 1 is utilized.

37. A molecularly imprinted polymer according to claim 1, wherein the duration of polymerisation is adjusted in a manner that optimizes the mass transfer properties of the resulting thin layer film.

38. A method according to claim 12, wherein the duration of the polymerisation is adjusted in a matter that optimizes the mass transfer properties of the resulting thin layer film.

* * * * *